(12) United States Patent
Wang et al.

(10) Patent No.: US 9,627,974 B1
(45) Date of Patent: Apr. 18, 2017

(54) ADAPTIVE VOLTAGE REGULATOR

(71) Applicant: Taiwan Semiconductor Manufacturing Co., Ltd., Hsin-Chu (TW)

(72) Inventors: Ruopeng Wang, Shanghai (CN); Alan Roth, Leander, TX (US); Eric Soenen, Austin, TX (US)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 14/927,523

(22) Filed: Oct. 30, 2015

(51) Int. Cl.
*H02M 3/158* (2006.01)

(52) U.S. Cl.
CPC .................. *H02M 3/158* (2013.01)

(58) Field of Classification Search
CPC .... H02M 1/083; H02M 3/158; H02M 3/1582; H02M 5/293; G05F 1/24; G05F 1/45; G05F 1/445; G05F 1/452; B23K 9/1031; H01F 27/2847
USPC ................... 323/235, 236, 247, 259
See application file for complete search history.

(56) References Cited

U.S. PATENT DOCUMENTS

| 5,596,532 A * | 1/1997 | Cernea ................... G11C 5/145 365/185.18 |
| 8,680,821 B2 * | 3/2014 | Vogman ................ H02M 3/156 323/222 |
| 2006/0062026 A1 * | 3/2006 | Wittenbreder ...... H02M 3/1588 363/21.06 |

* cited by examiner

*Primary Examiner* — Yemane Mehari
(74) *Attorney, Agent, or Firm* — Duane Morris LLP

(57) ABSTRACT

A voltage regulator circuit includes: a comparator configured to have a first input coupled to an output voltage of the voltage regulator circuit; a second input coupled to a reference voltage and an output signal; a first transistor; a second transistor, a drain of the first transistor connected to a drain of the second transistor; an inductor connected to the drain of the first transistor and the drain of the second transistor; a capacitor and a resistor connected in parallel, between the output node and a source of the second transistor; a peak-current detector unit configured to detect peak current in the inductor; a zero-crossing detector unit configured to detect a zero-crossing current in the inductor; and a control unit configured to receive a plurality of input signals including at least an input voltage and a clock signal.

20 Claims, 9 Drawing Sheets

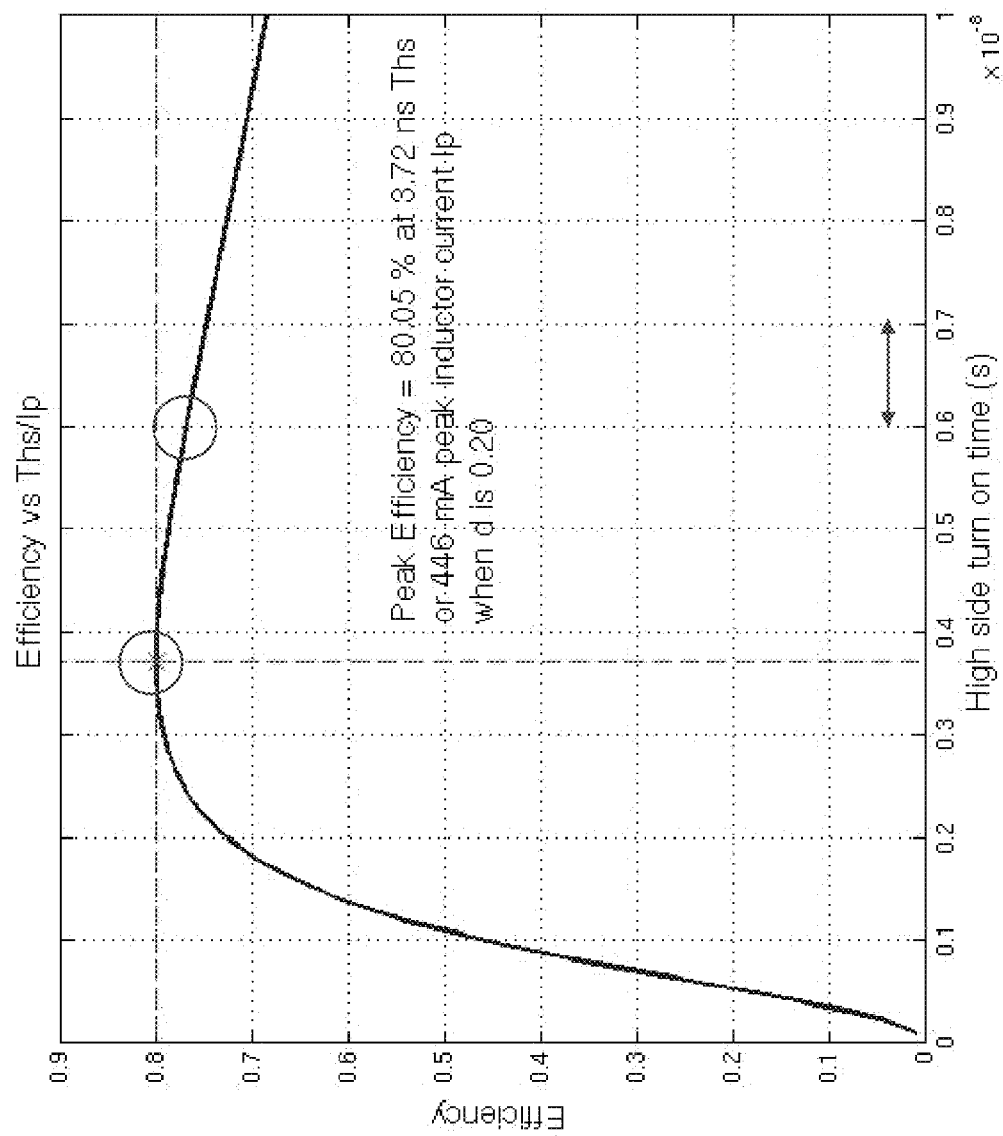
Figure 3C, d = 0.20

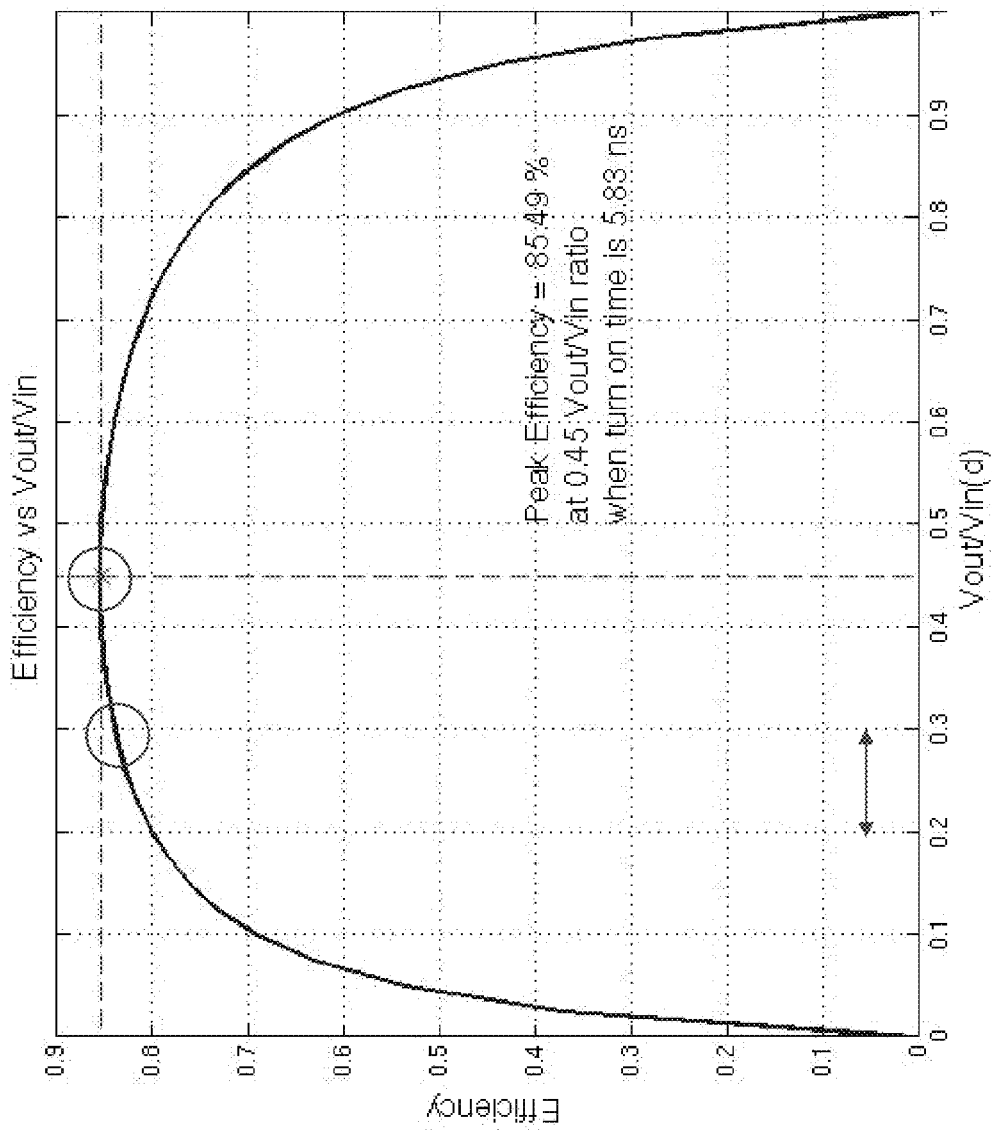
Figure 3D, Turn on time = 5.83ns

ADAPTIVE VOLTAGE REGULATOR

BACKGROUND

A voltage regulator is designed to maintain a constant voltage level. A voltage regulator may be a simple "feed-forward" design or may include negative feedback control loops. A voltage regulator may use an electromechanical mechanism or electronic components, and depending on the design, it may be used to regulate one or more AC or DC voltages. Electronic voltage regulators are found in devices such as computer power supplies where they stabilize the DC voltages used by the processor and other elements. In automobile alternators and central power station generator plants, voltage regulators control the output of the plant. In an electric power distribution system, voltage regulators may be installed at a substation or along distribution lines so that all customers receive steady voltage independent of how much power is drawn from the line.

With recent developments regarding the Internet of Things (IoT), wearable devices, and other mobile technologies, new considerations arise for voltage regulators. Such new considerations include minimum hardware, low cost, compact design, high performance, and high efficiency. As an example, wireless sensors built into glasses, watches, motion trackers, and even clothes promise to revolutionize connectivity and form a key part of the IoT. Such wireless sensors are challenging applications for compact voltage regulators because typically in such implementations, the voltage regulator handles wide input and output ranges.

Voltage regulators for IoT and other compact devices seek to maintain maximum efficiency over long periods of time. After a period of time, however, the batteries in such devices tend to deteriorate, degrading efficiency. For non-adaptive voltage regulators, such deviation causes a significant waste of energy and reduces life of devices.

BRIEF DESCRIPTION OF THE DRAWINGS

Aspects of the present disclosure are best understood from the following detailed description when read with the accompanying figures. It is noted that, in accordance with the standard practice in the industry, various features are not necessarily drawn to scale. In fact, the dimensions of the various features may be arbitrarily increased or reduced for clarity of discussion.

FIG. 3C is a plot diagram illustrating efficiency as a function of high side turn on time $T_{HS}$ at a fixed duty ratio (d=0.20) in accordance with some embodiments.

FIG. 3D is a plot diagram illustrating efficiency as a function of duty ratio d at a fixed high side turn on time ($T_{HS}$=5.83 nanoseconds) in accordance with some embodiments.

DETAILED DESCRIPTION

Figure 1:
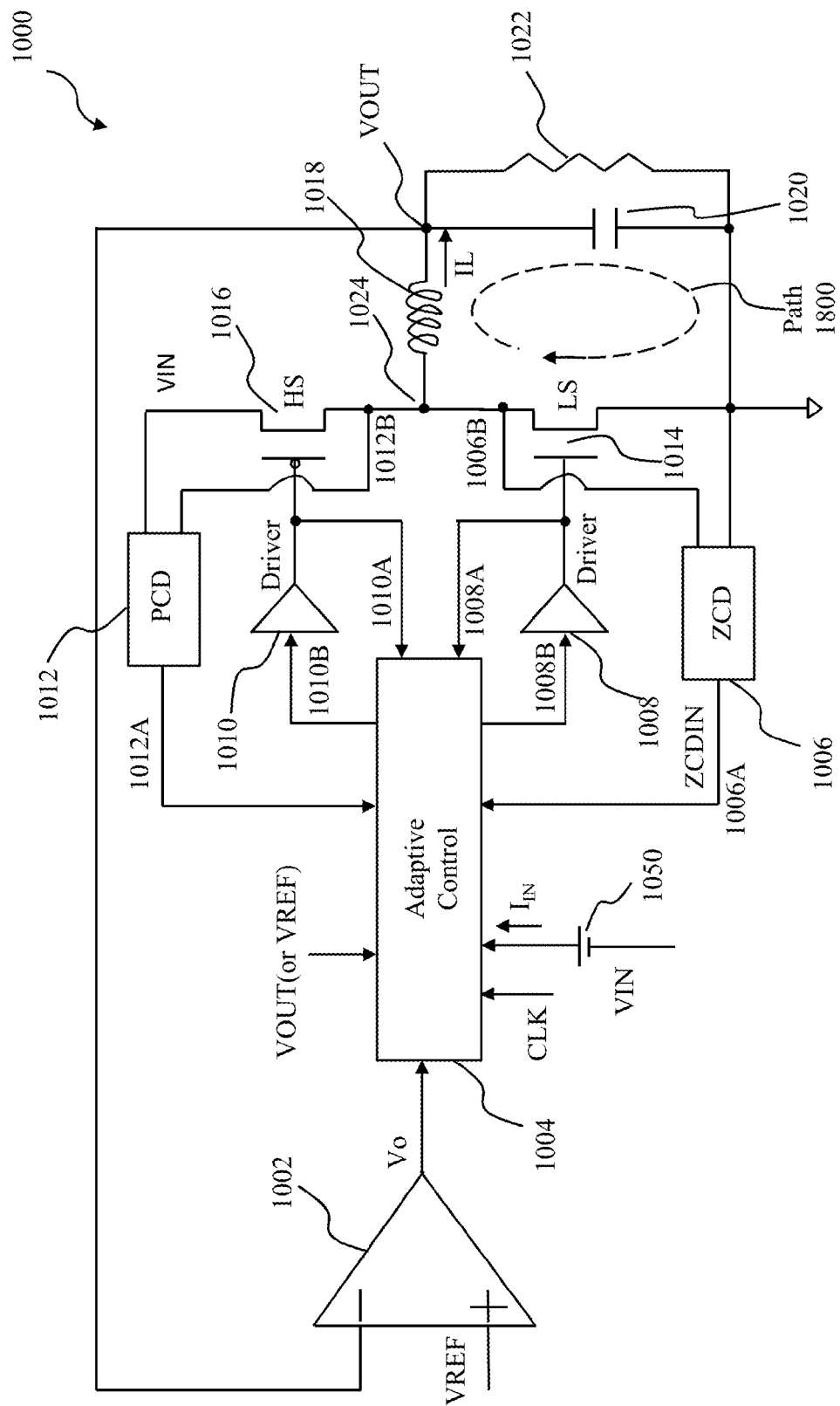
FIG. 1 is a schematic diagram illustrating an adaptive voltage regulator in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a schematic diagram illustrating an adaptive voltage regulator 1000 in accordance with some embodiments. The voltage regulator 1000 includes a comparator 1002, an adaptive control unit 1004, a zero-crossing detector (ZCD) 1006, a low side driver 1008, a high side driver 1010, a peak-current detector (PCD) 1012, a low side NMOS transistor 1014, a high side PMOS transistor 1016, an inductor 1018, a capacitor 1020, and a load resistor 1022. In some embodiments, the high side driver 1010 and low side driver 1008 each include a string of inverters with increasing gains. The node connecting 1014, 1016 and 1018 is a switching node, which is labeled as 1024. The adaptive control unit 1004 includes the following inputs: $V_{OUT}$ (or $V_{REF}$ because $V_{OUT}$ is maintained at a voltage close to $V_{REF}$), Vo (the output from the comparator 1002), CLK (clock signal), and $V_{IN}$ (input voltage).

According to some embodiments, the adaptive control unit 1004 adaptively calculates control parameters to achieve a maximum efficiency of the voltage regulator circuit. As used herein, "adaptive" means that the control unit 1004 is capable of re-calculating control parameters based on changing conditions. The adaptive control unit 1004 drives the high side transistor driver 1010 with a control signal 1010B, and drives the low side driver 1008 with a control signal 1008B. As discussed in further detail below with respect to FIG. 4, the high side driver 1010 transmits a feedback signal 1010A back to the adaptive control unit 1004 for dead time control. Similarly, the low side driver 1008 transmits a feedback signal 1008A back to the adaptive control unit 1004 for dead time control. In some embodiments, the PCD 1012 detects a peak current of the high-side transistor via signal line 1012B connected to node 1024, and then transmits a control signal 1012A to the adaptive control unit 1004 to turn OFF the high side transistor 1016, as discussed in further detail below. The zero-crossing detector 1006 is coupled to node 1024 via signal line 1024 to detect zero-crossings of inductor current $I_L$, and thereafter transmits a control signal 1006A to the adaptive control unit 1004 that instructs the control unit 1004 to turn on the high-side transistor 1016, as discussed further below. In some embodiments, the PCD 1012 and ZCD 1006 are coupled to a power source (e.g., a $V_{DD}$ power rail of the circuit—not shown) that powers the PCD 1012 and ZCD 1006. As shown in FIG. 1, in some embodiments, the source of the high side transistor 1016 is coupled to the PCD 1012 and its power source, which supplies power to the high side transistor 1016 when it is turned ON, as discussed in further detail below.

$V_{OUT}$ is the output voltage of the voltage regulator circuit 1000 that is fed back to the adaptive control unit 1004. $V_{REF}$ is an accurately maintained reference voltage at a much lower power than $V_{OUT}$. $V_{REF}$ does not have sufficient power to directly supply output voltage to the load, instead, $V_{REF}$ only serves as a reference standard for $V_{OUT}$. The voltage regulator is implemented to maintain the output voltage $V_{OUT}$ as close to the reference voltage $V_{REF}$ as possible. The comparator 1002 compares the $V_{OUT}$ and $V_{REF}$ signals provided at its input terminals, which are marked in FIG. 1 as + and −. The comparator 1002 outputs a digital signal Vo indicating which one of $V_{OUT}$ and $V_{REF}$ is larger. The output of the comparator 1002 is transmitted to the adaptive control unit 1004. The adaptive control unit 1004 drives the high side transistor 1016 through the high side driver 1010. According to some embodiments, the high side transistor 1016 is a PMOS transistor.

In some embodiments, a peak current detector is a series connection of a diode and a capacitor that outputs a DC voltage equal to the peak value of the applied AC signal. Peak-current detector (PCD) 1012 detects when a peak current of $I_L$ flows through the inductor 1018. Once a peak current is reached, the adaptive control unit 1004 turns off the high side transistor 1016. When high side transistor 1016 is turned off, after a predetermined dead time period (time interval during which no device can be turned on to prevent a short circuit), the low side transistor 1014 is turned on. A current loop or path 1800 is formed along the low side transistor 1014, the inductor 1018, the capacitor 1020 and the load resistor 1022. Electric energy is dissipated in the loop 1800 due to the inherent resistance, capacitance and inductance in the loop. As a result, the electric current $I_L$ across the inductor 1018 decreases over time, as discussed in further detail below with reference to FIG. 2.

In some embodiments, an input voltage $V_{IN}$ to the adaptive control unit 1004 is supplied by a battery 1050. A duty ratio d is calculated as $V_{OUT}/V_{IN}$, and this ratio is then used to set the turn on time duration of the high side transistor 1016. As a result, the high side transistor 1016 is turned on for the period of time equal to the turn on time duration and $V_{OUT}$ is driven up by the current flowing through the high side transistor 1016. Then the high side 1016 transistor is turned off and the low side transistor 1014 is turned on after a period of dead time.

According to some embodiments, the low side transistor 1014 is an NMOS transistor. When $V_{OUT}$ approaches $V_{REF}$ as the current $I_L$ decreases, the comparator 1002 detects the condition when $V_{OUT}=V_{REF}$. Once $V_{OUT}$ becomes no larger than $V_{REF}$, the adaptive control unit 1004 turns on the high side transistor 1016, and the low side transistor 1014 is maintained off. A zero-crossing is a point where the sign of a mathematical function or signal changes (e.g. from positive to negative or zero, or from negative to positive or zero), represented by a crossing of the axis (zero value) in the graph of the function. When a zero-crossing event is detected by the zero-crossing detector (ZCD) 1006, a corresponding control signal 1006A is generated by the ZCD 1006 to control the adaptive control unit 1004, as discussed in further detail below. According to some embodiments, the control signal 1006A informs the adaptive control unit 1004 of the zero-crossing event. After receiving the control signal 1006A, the adaptive control unit 1004 initiates steps to turn on high side transistor 1016. In some embodiments, the control signal 1006A is not generated when the signal value $I_L$ is actually zero. Rather, the control signal may be generated slightly earlier when $I_L$ is falling and close to zero to allow enough time to avoid reaching a negative value. According to some embodiments, when the signal actually gets into negative territory, the circuit 1000 may be damaged due to a short circuit.

When high side transistor 1016 is turned on, current flows across the source and drain terminals of that transistor, then through the inductor 1018, then through the capacitor 1020 and the load resistor 1022. As a result, $V_{OUT}$ starts to rise again. More details regarding the characteristics and behavior of the inductor current $I_L$ will be discussed below in connection with FIG. 2.

Figure 2:
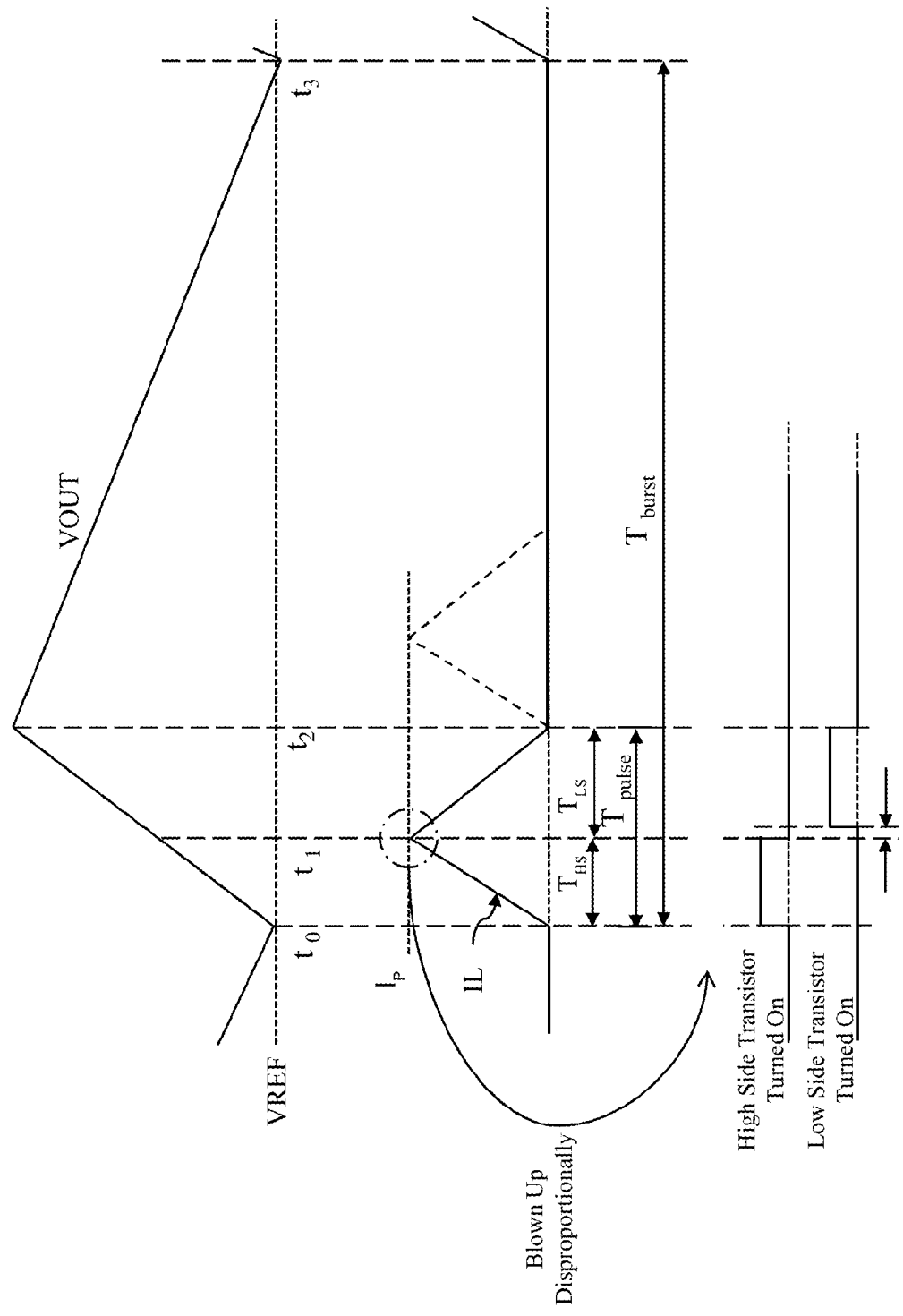
FIG. 2 is a signal plot diagram illustrating reference voltage $V_{REF}$, output voltage $V_{OUT}$ and inductor current $I_L$ in accordance with some embodiments.

FIG. 2 is a diagram illustrating reference voltage $V_{REF}$, output voltage $V_{OUT}$ and inductor current $I_L$ in accordance with some embodiments. As discussed above, the voltage regulator is implemented to keep output voltage ($V_{OUT}$) as close to reference voltage ($V_{REF}$) as possible. In FIG. 2, $V_{REF}$ is kept at a constant value with lower power implementation compared with $V_{OUT}$, and $V_{OUT}$ fluctuates around $V_{REF}$. Inductive current $I_L$ is the current that flows through the inductor 1018, and $V_{OUT}$ is compared with $V_{REF}$ by the comparator 1002. At time $t_0$, the comparator 1002 detects that $V_{OUT}$ is no larger than $V_{REF}$, and the output Vo of the comparator 1002 is transmitted into the adaptive control unit 1004, which triggers the high side driver 1010 to turn on the high side transistor 1016. The high side transistor 1016 is turned on, $I_L$ starts to increase linearly, and the slope of the rising current is $(V_{IN}-V_{OUT})/L$, where L is the inductance of the filtering inductor 1018. During the rising time duration $T_{HS}$, the high side transistor 1016 is kept on.

According to some embodiments, a battery 1050 supplies the input voltage $V_{IN}$ and in input current $I_{IN}$. The current flows in from the battery 1050 to the high side driver 1010, which drives the high side transistor 1016. When the high side driver 1010 turns on the gate of the high side transistor 1016, current flows through the high side transistor 1016 from source to drain. The current then flows through the inductor 1018, the capacitor 1020 and the resistor 1022 before reaching ground. As discussed in further detail below with respect to FIG. 4, in some embodiments, the low side transistor 1014 is kept off during a "dead time" to prevent the formation of short circuits. After flowing through the inductor 1018, the current $I_L$ then flows in parallel through the load resistor 1022 and load capacitor 1020 to the ground. The current $I_L$ is also fed into the zero crossing detector 1006. When the inductor current $I_L$ approaches zero, a control signal 1006A will be sent to the adaptive control unit 1004 that instructs the adaptive control unit 1004 to turn OFF the low-side transistor 1014.

When $I_L$ reaches a peak current ($I_P$) level, the peak-current detector 1012 detects the condition through the connection 1012B and sends a control signal 1012A to the adaptive control unit 1004, which turns off the high side transistor 1016. After a short dead time duration (illustrated in FIG. 2) which is implemented to prevent a short-circuit, a control signal 1008A is used to turn on the low side transistor 1014. The control signal 1008A is also transmitted back to the adaptive control unit 1004 for dead time control. $I_L$ starts to drop linearly at time $t_1$, with a slope $V_{OUT}/L$. As a result, the current flows in a loop, following path 1800, from the low side transistor 1014 to the inductor 1018, then to the load resistor 1022 and load capacitor 1020. The current decreases in this closed loop. The drop time, which is the time for the current to decrease to zero from peak $I_p$, is $T_{LS}=I_p/\text{Slope}=I_p/(V_{OUT}/L)=I_p*L/V_{OUT}$.

Once the current $I_L$ approaches zero, the zero-crossing detector 1006 detects the zero-crossing condition and sends the control signal 1012A to the adaptive control unit 1004, which turns off the low side transistor 1008. Then, according to some embodiments, both the high side transistor 1016 and the low side transistor 1014 are turned off and the inductor current $I_L$ stays at zero for the rest of the burst period $T_{burst}$ following $t_2$. At time $t_0$, the slope of $V_{OUT}$ changes from negative to positive; a burst period is the period between two such events when $V_{OUT}$ approaches $V_{REF}$. Thus, $T_{burst}$ is the time duration between $t_0$ and $t_3$ in which $V_{OUT}$ rises to its maximum value and then falls to $V_{REF}$ again, in accordance with some embodiments. Because both the rising slope of $I_L$ and the dropping slope of $I_L$ are known as discussed above, $T_{HS}$ and $T_{LS}$ are also known. $T_{pulse}$ is the pulse time duration. $T_{pulse}$ is defined as $T_{pulse}=T_{HS}+T_{LS}$, so $T_{pulse}$ is also known. By design, $T_{burst}$ is larger than $T_{pulse}$. According to some embodiments, if the first triangular pulse 2100 is not enough to drive up $V_{OUT}$ sufficiently, additional triangular pulses may be used to drive up $V_{OUT}$ as illustrated as dashed line triangular pulse 2200 in FIG. 2. Additional triangular pulses can be generated in the same way as the first pulse discussed above.

Figure 3A:
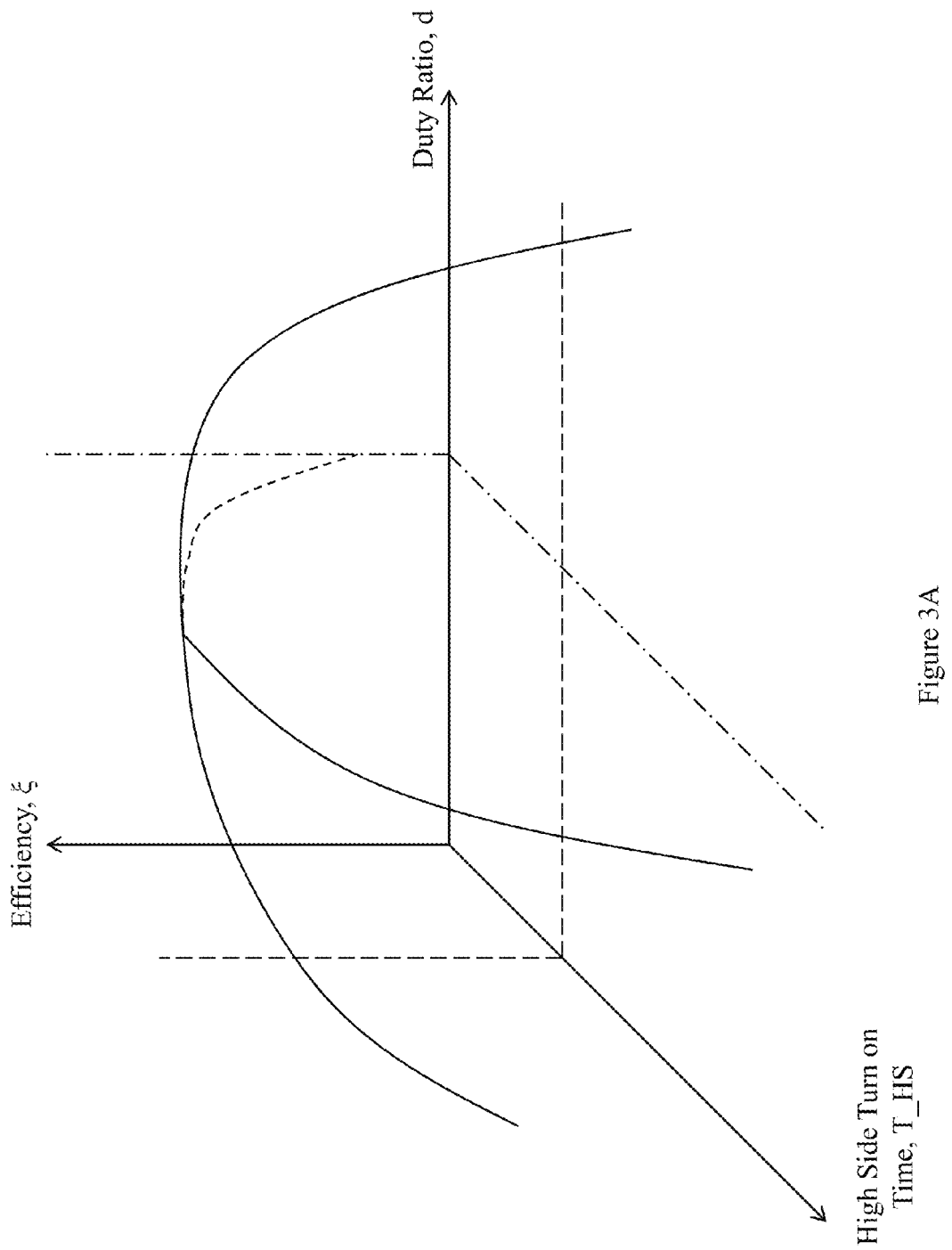
FIG. 3A is a plot diagram illustrating efficiency $\xi$ as a function of duty ratio d and high side turn on time $T_{HS}$ in accordance with some embodiments.

FIG. 3A is a three dimensional surface plot illustrating the efficiency $\xi$ as a function of the duty ratio d ($d=V_{OUT}/V_{IN}$) and the high side turn on time $T_{HS}$ in accordance with some embodiments. According to some embodiments, the high side turn on time duration $T_{HS}$ is the duration of time the high side transistor is turned on.

In some embodiments, the design of the adaptive voltage regulator 1000 which is capable of adaptively reaching maximum efficiency over a wide range of input and output levels is based on a detailed analysis of the efficiency $\xi$ as a function of duty ratio d and high side turn on time $T_{HS}$, as set forth in the following equations. The efficiency $\xi$ can be optimized by either adaptively changing the duty ratio, or changing the high side turn on time duration, or a combination of both. When external conditions, such as $V_{IN}$, change over time, the duty ratio changes accordingly. And as a result, efficiency $\xi$ deviates away from its existing optimal value. To determine a new optimal value for $\xi$, partial derivatives can be set equal to zero as follows: $\partial\xi/\partial d=0$, and $\partial\xi/\partial T_{HS}=0$. A detailed analysis of efficiency $\xi$ and its partial derivatives is presented below.

The efficiency $\xi$ of a voltage regulator is defined as:

$$\xi = \frac{E_{out}}{E_{loss\_total}+E_{out}} = \frac{1}{\frac{E_{loss\_total}}{E_{out}}+1} \quad (1)$$

where $E_{out}$ is the output energy, and $E_{loss\_total}$ is the total energy loss.

$E_{loss\_total}$ is defined as the total energy loss due to various conditions, including $E_{c\_p}$, $E_{g\_p}$, $E_{c\_n}$, $E_{g\_n}$, $E_{sw}$, $E_{c\_i}$, $E_{c\_c}$, $E_{other\_c}$ and $E_{other\_i}$ according to some embodiments. The details of these terms contributing to total energy loss are discussed below.

In the embodiment illustrated in FIG. 1, $E_{c\_p}$ is the conductive (c) energy loss on the high side transistor (e.g., HS 1016), which is a PMOS (p), $I_p$ is the current that flows through the PMOS (p), $R_{ds\_p}$ is the turn on resistance between drain (d) and source (s) of the high side PMOS (e.g., HS 1016), $T_{HS}$ is the high side turn on time duration. Detailed mathematical discussion of $T_{HS}$ is presented below.

In the embodiment illustrated in FIG. 1, $E_{g\_p}$ is the gate (g) energy loss on the high side transistor (e.g., HS 1016), which is a PMOS (p); $C_{gs\_p}$ is the capacitance between gate (g) and source (s) of the high side PMOS (p); $C_{gd\_p}$ is the capacitance between gate (g) and drain (d) of the high side PMOS (p); and $V_i$ is the input voltage.

In the embodiment illustrated in FIG. 1, $E_{c\_n}$ is the conductive (c) energy loss on the low side transistor (e.g., LS 1014), which is a NMOS (n), $I_n$ is the current that flows through the NMOS (n), $R_{ds\_n}$ is the turn on resistance between drain (d) and source (s) of the high side NMOS (e.g., LS 1014), $T_{LS}$ is the low side turn on time, $T_{LS}=I_p*L/V_{OUT}=T_{HS}*(V_{IN}-V_{OUT})/L$, where L is the inductance of the inductor 1018. Detailed mathematical discussion of $T_{LS}$ and $T_{HS}$ is presented below.

In the embodiment illustrated in FIG. 1, $E_{g\_n}$ is the gate (g) energy loss on the low side transistor (e.g., LS 1014), which is a NMOS (p); $C_{gs\_n}$ is the capacitance between gate (g) and source (s) of the low side NMOS (p); $C_{gd\_n}$ is the capacitance between gate (g) and drain (d) of the low side NMOS (p); and $V_i$ is the input voltage.

In the embodiment illustrated in FIG. 1, $E_{sw}$ is the switching energy loss on the switching node 1024 connecting 1016, 1014 and 1018. $C_{sw}$ is the equivalent capacitance on the switching node 1024, $V_i$ is the input voltage and $V_o$ is the output voltage. The definition of each parameter is listed below:

The energy loss due to PMOS conduction is:

$$E_{c\_P} = I_p^2 \cdot R_{ds_p} \cdot \frac{T_{HS}}{3} \quad (2)$$

where the subscript "c" represents "conduction", the subscript "p" represents "PMOS", subscript "ds" represents "drain-source".

The energy loss due to PMOS gate capacitance is:

$$E_{g\_p} = \frac{1}{2}(C_{gs\_p} + 2C_{gd\_p})V_i^2 \quad (3)$$

where the subscript "g" represents "gate", the subscript "gs" represents "gate-source", the subscript "gd" represents "gate-drain", and subscript "i" represents input.

The energy loss due to NMOS conduction is:

$$E_{c\_n} = I_p^2 \cdot R_{ds_n} \cdot \frac{T_{HS}}{3} \quad (4)$$

where the subscript "c" represents "conduction", the subscript "n" represents "NMOS", subscript "ds" represents "drain-source".

The energy loss due to NMOS gate capacitance is:

$$E_{g\_n} = \frac{1}{2}\left(C_{gs\_n} + \frac{4}{3}C_{gd\_n}\right)V_i^2 \quad (5)$$

where the subscript "g" represents "gate", the subscript "gs" represents "gate-source", the subscript "gd" represents "gate-drain", and subscript "i" represents input.

The switching energy loss is:

$$E_{sw} = \frac{1}{2}C_{sw}(V_i - V_o)^2 + \frac{1}{2}C_{sw}V_i^2 \quad (6)$$

where the subscript "sw" represents "switching", the subscript "i" represents input.

The energy loss due to conduction on the inductor is:

$$E_{c\_i} = I_p^2 \cdot R_{dcr} \cdot \frac{T_{pulse}}{3} \quad (7)$$

where the subscript "c" represents "conduction", the subscript "i" represents inductor, the subscript "dcr" represents direct current resistance.

The energy loss due to conduction on the capacitor is:

$$E_{c\_c} = I_p^2 \cdot R_{esr} \cdot \frac{T_{pulse}}{12} \quad (8)$$

where the subscript "c" represents "conduction", the second subscript "c" represents capacitance, the subscript "esr" represents equivalent serial resistance.

Other energy loss due to other conduction is:

$$E_{other\_c} = I_p^2 \cdot (R_m + R_b + L_t) \cdot \frac{T_{pulse}}{3} = I_p^2 \cdot R_T \cdot \frac{T_{pulse}}{3} \quad (9)$$

where $R_T$ is the total resistance of all other resistance.

Other energy loss due to other inductance is:

$$E_{other\_i} = \frac{1}{2}I_p^2 \cdot (L_m + L_b + L_t) = \frac{1}{2}I_p^2 \cdot L_T \quad (10)$$

where $L_T$ is the total inductance of all other inductance.

In the embodiment illustrated in FIG. 1, $E_{c\_i}$ is the conductive (c) energy loss on the inductor (i) 1018 due to equivalent resistance of the inductor (i) 1018. $I_p$ is the current that flows through the PMOS (p), $R_{dcr}$ is the equivalent direct current resistance. $E_{c\_c}$ is the conductive (c) energy loss on the capacitor (c) 1020 due to equivalent resistance of the capacitor 1020. $R_{esr}$ is the equivalent serial resistance of the capacitor 1020. $T_{pulse}$ is the pulse time. $E_{other\_c}$ is the conductive energy loss due to all other factors, which has a total equivalent resistance $R_T$, and $E_{other\_i}$ is the inductive energy loss due to all other factors, which has a total equivalent inductance $L_T$. to summarize:

$$E_{loss\_total} = E_{c\_p} + E_{g\_p} + E_{c\_n} + E_{c\_n} + E_{sw} + E_{c\_i} + E_{c\_c} + E_{other\_c} + E_{other\_i} \quad (11)$$

To further simplify the equations, $$\text{Set } R_{ds\_p} = R_{on}, R_{ds\_n} = \alpha \cdot R_{ds\_p}, V_o = d \cdot V_i \quad (12)$$

$$C_g = \frac{1}{2}\left(C_{gs_p} + 2C_{gd_p}\right) + \frac{1}{2}\left(C_{gs\_n} + \frac{4}{3}C_{gd\_n}\right)$$

An expression for $E_{loss\_total}$ is this obtained:

$$E_{loss\_total} = \quad (12)$$
$$I_p^2 \cdot \left(R_{on} \cdot \frac{T_{HS}}{3} + \alpha \cdot R_{on} \cdot \frac{T_{LS}}{3} + R_{dcr} \cdot \frac{T_{pulse}}{3} + R_{esr} \cdot \frac{T_{pulse}}{12} + R_T \cdot \frac{T_{pulse}}{3} + \frac{L_T}{2}\right) + V_i^2 \cdot \left(C_g + \frac{C_{sw}}{2} + \frac{C_{sw}}{2} \cdot (1-d)^2\right)$$

And $E_{out}$ may be expressed as follows:

$$E_{out} = Q_l \cdot V_o = \frac{T_{HS}^2 \cdot V_i(V_i - V_o)}{2 \cdot L \cdot V_o} \cdot V_o = \frac{T_{HS}^2 \cdot V_i^2(1-d)}{2 \cdot L} = \frac{I_p^2 \cdot L}{1-d} \quad (14)$$

then:

$$\frac{E_{loss\_total}}{E_{out}} = k_1 \cdot T_p + k_2 + k_3 \cdot T_p^{-2} \quad (15)$$

where:

$$k_1 = \frac{2}{3} \cdot \frac{1-d}{L \cdot d} \cdot \left\{[\alpha + (1-\alpha) \cdot d] \cdot R_{on} + R_{dcr} + R_T + \frac{R_{esr}}{4} + \frac{L_T \cdot d}{2}\right\} \quad (16)$$

and:

$$k_2 = \frac{L_T}{L} \cdot (1-d) \quad (17)$$

and:

$$k_3 = \frac{2L}{1-d} \cdot \left(C_g + \frac{C_{sw}}{2} + \frac{C_{sw}}{2} \cdot (1-d)^2\right) \quad (18)$$

To reach the maximum efficiency, take partial derivatives as follows: $\partial \xi(d, T_{HS})/\partial d = 0$, and $\partial \xi(d, T_{HS})/\partial T_{HS} = 0$, where $\xi(d, T_{HS}) = E_{loss\_total}/E_{out}$, accordingly $$\frac{\partial}{\partial(d)}\left(\frac{E_{loss\_total}}{E_{out}}\right) = 0, \frac{\partial}{\partial(T_{HS})}\left(\frac{E_{loss\_total}}{E_{out}}\right) = 0 \quad (19)$$

where:

$$T_{HS} = \left(\frac{2 \cdot k_3}{k_1}\right)^{1/3}$$

and $$I_p = V_i \frac{(1-d)}{L}\left(\frac{2 \cdot k_3}{k_1}\right)^{1/3}$$

The maximum efficiency is:

$$\xi_{max} = \frac{E_{out}}{E_{loss\_total} + E_{out}} = \frac{1}{\frac{E_{loss\_total}}{E_{out}} + 1} \quad (20)$$

which yields:

$$\xi_{max} = \frac{1}{1 + k_2 + k_1 \cdot \left(\frac{2 \cdot k_3}{k_1}\right)^{\frac{1}{3}} + k_3 \left(\frac{2 \cdot k_3}{k_1}\right)^{-\frac{2}{3}}} \quad (21)$$

To further simplify:

$$k_1 = \beta_1 \cdot \frac{1-d}{d} + \beta_2 \cdot (1-d), \quad (22)$$

where $\beta_1 = \frac{2}{3L}\left(R_{on} + R_{dcr} + R_T + \frac{R_{esr}}{4}\right)$, and $\beta_2 = \frac{L_T}{3L}, \beta_1 \gg \beta_2$ $$k_3 = \beta_3 \cdot \frac{1}{1-d} + \beta_4 \cdot (1-d), \quad (23)$$

where $\beta_3 = L \cdot (2C_g + C_{sw}), \beta_4 = L \cdot C_{sw}$ $$T_{HS} = \left(\frac{3 \cdot L^2 (2C_g + C_{sw})}{R_{on} + R_{dcr} + R_T + \frac{R_{esr}}{4}} \cdot \frac{d}{(1-d)^2}\right)^{1/3} = K \cdot \left(\frac{d}{(1-d)^2}\right)^{\frac{1}{3}} \quad (24)$$

$$I_p = V_i \frac{(1-d)}{L} \cdot T_{HS} \quad (25)$$

In the simplified formula, the high side turn on time duration $T_{HS}$ is a function of duty ratio d:$T_{HS}$=K* $(d/(1-d)^2)^{(1/3)}$, where d is $V_{OUT}/V_{IN}$. Thus, $T_{HS}$ is conveniently determined when the constant K (see equation (24)) is provided.

From the analysis above, the efficiency ξ is a function of both d and $T_{HS}$: ξ(d, $T_{HS}$), which is a three dimensional surface, roughly outlined as two orthogonal contour lines as illustrated in FIG. 3A. In the horizontal plane, the x-axis is $T_{HS}$ (high side turn on time duration), and the y-axis is d (duty ratio). The z-axis is the corresponding efficiency ξ value for a pair of ($T_{HS}$, d).

Due to the three dimensional nature of the ξ(d, $T_{HS}$) surface, the maximum efficienc $ξ^{max}$ depends on both parameters d and $T_{HS}$. When one of the parameters is fixed, or for some reasons cannot be sufficiently modified, then only a local maximum can be reached, not the global maximum. The global maximum is the true maximum efficiency of the system.

Figure 3B:
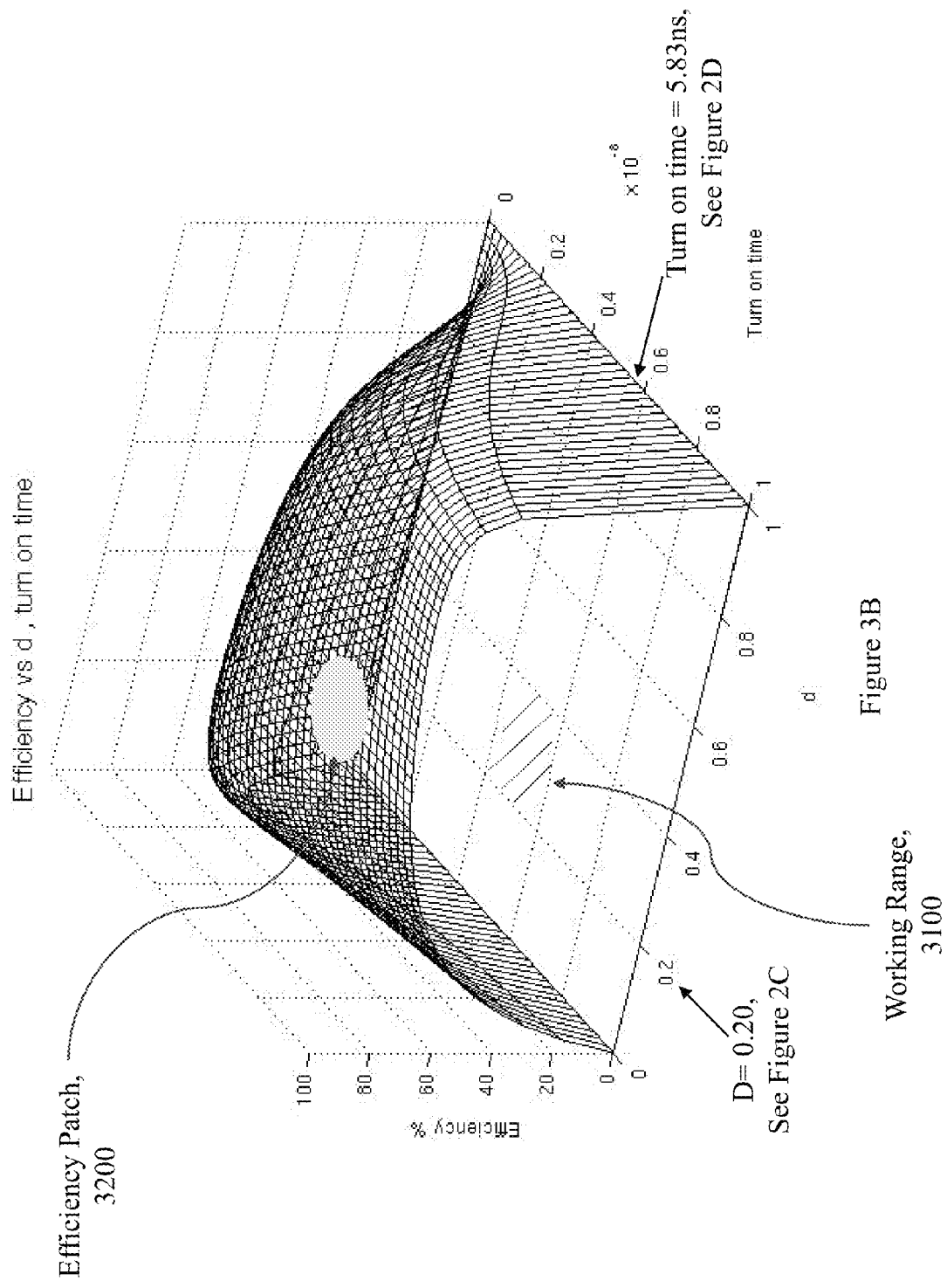
FIG. 3B is a surface mesh illustrating the efficiency $\xi$ as a function of duty ratio d and high side turn on time $T_{HS}$ in accordance with some embodiments

FIG. 3B is a surface plot illustrating the efficiency ξ as a function of duty ratio d and high side turn on time duration $T_{HS}$ in accordance with some embodiments. The surface plot in FIG. 3B is plotted as a function of duty ratio d and high side turn on time duration $T_{HS}$. In this figure, duty ratio ranges from 0 to 1, and turn on time duration ranges from 0 to 10 nanoseconds. As a result, the efficiency ξ value has a wide range. This wide efficiency ξ range is a theoretical range. In practice, according to some embodiments, the duty ratio of a voltage source is limited by various factors, which confine the duty ratio to a rather narrow range. For example, for applications in IoT powered by compact batteries, the output voltage of the compact batteries varies over the life time of the device. As a result, the duty ratio d changes over time. The duty ratio of a new device might be significantly different from the duty ratio of a used device. As a result, even if the efficiency is maximized when the device is shipped from the factory, the efficiency will inevitably deviate away from that optimal value after a period of time.

Due to the specific characteristics of the batteries, their practical duty ratio does not actually range from 0 to 1 as illustrated in FIG. 3B. The actual duty ratio of a given battery might be a narrow slice in the d-$T_{HS}$ plane. Similarly, the actual turn on time duration might also be a narrow slice in the d-$T_{HS}$ plane. The resulting working range (the range that is actually reachable by the working device) of the device is a rectangle 3100 in the d-$T_{HS}$ plane as illustrated in FIG. 3B, and the corresponding efficiency ξ is a patch 3200 of the curved surface above the working range 3100, which is called the efficiency patch. Every device works within its efficiency patch, and the maximum efficiency of a device can only be achieved inside its own efficiency patch. The global maximum of the efficiency surface is not guaranteed to be achieved by any individual device. The embodiment in FIG. 1 is implemented to adaptively achieve the maximum efficiency within its own efficiency patch. When the battery deteriorates over time, the efficiency floats to a different point on the efficiency patch. The embodiment in FIG. 1 adaptively maximizes the efficiency on the efficiency patch by calculating new duty ratio values and new turn on time duration values.

FIG. 3C is a curve illustrating the efficiency as a function of high side turn on time duration $T_{HS}$ at a fixed duty ratio (d=0.20) in accordance with some embodiments. The efficiency curve in FIG. 3C is a cross sectional view of the efficiency surface in FIG. 3B when duty ratio d is fixed at 0.20. FIG. 3C shows that when duty ratio is fixed at 0.20, the maximum efficiency 80.05% is achieved when turn on time is 3.72 nanoseconds. As discussed in FIG. 3B, often in practice, the high side turn on time duration cannot range from 0 to 10 nanoseconds. For example, if for various practical reasons for a particular device, its high side turn on time duration is confined within the range of from 6 nanoseconds to 7 nanoseconds, then that device's maximum efficiency cannot reach the global maximum over the whole range of 0 to 10 nanoseconds. Instead, as can be observed on the curve, the maximum efficiency is the efficiency value (actual value not shown) when the high side turn on time duration is 6 nanoseconds.

FIG. 3D is a curve illustrating the efficiency as a function of duty ratio d at a fixed high side turn on time duration ($T_{HS}$=5.83 nanoseconds) in accordance with some embodiments. The efficiency curve, in FIG. 3D is a cross sectional view of the efficiency surface in FIG. 3B when the high side turn on time duration is fixed at 5.83 nanoseconds. FIG. 3D shows that when high side turn on time is fixed at 5.83 nanoseconds, the maximum efficiency 85.49% is achieved when duty ratio is 0.45. As discussed in FIG. 3B, often times in practice, the duty ratio d cannot range from 0 to 1. For example, if for various practical reasons a particular device's duty ratio is confined within a working range of from 0.2 and 0.3, then that device's maximum efficiency cannot reach the global maximum over the whole range of d from 0 to 1. Instead, as can be observed on the curve, the maximum efficiency is the efficiency value (actual value not shown) when the duty ratio is 0.3.

Figure 4:
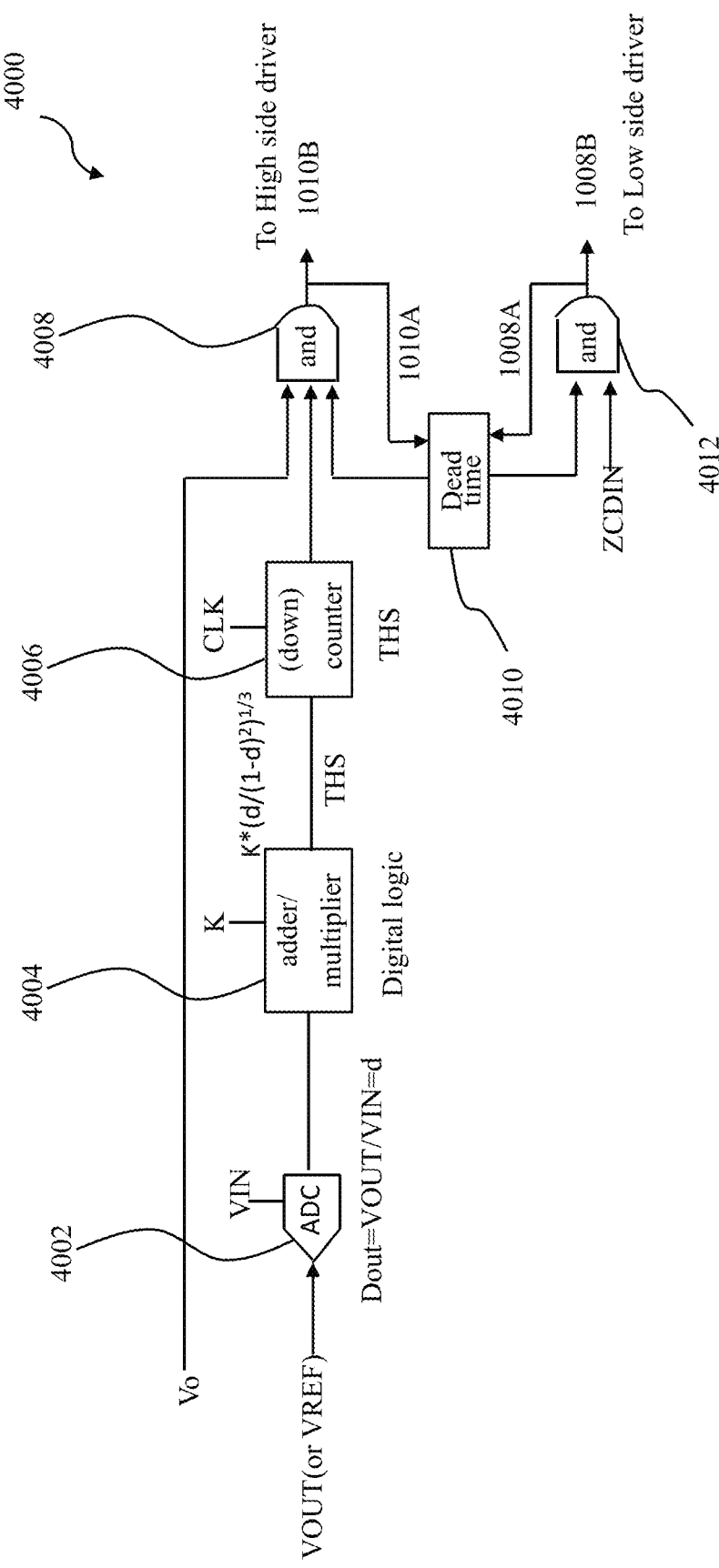
FIG. 4 is a block diagram illustrating a digital implementation of an adaptive control unit in accordance with some embodiments.

FIG. 4 is a schematic diagram of the adaptive control unit 1004 in accordance with some embodiments. In this implementation, the adaptive control unit 1004 includes an analog-to-digital converter device ADC 4002, an adder/multiplier device 4004, a down counter device 4006, a first AND logic circuit 4008, a dead-time unit 4010, and a second AND logic circuit 4012. The dead time unit 4010 serves as a safeguard to prevent the high side transistor 1016 and low side transistor 1014 from being turned on at the same time. As discussed above, dead time is a short period of time during which no devices are allowed to be turned on to prevent damage to the circuit (e.g., a short circuit). If the turning on time of the high side transistor 1016 and low side transistor 1014 were to overlap, or if the low side transistor 1014 were to be turned on before the high side transistor 1016 is turned off, a short circuit condition and damage to the entire system could result.

The input voltage $V_{IN}$ is used as a reference voltage for the ADC 4002 (not the reference voltage of the voltage regulator), and the output voltage of the voltage regulator $V_{OUT}$ is used as the input to the ADC 4002. According to some embodiments, the output of the ADC 4002 is $D_{OUT}=V_{OUT}/V_{IN}$, which is by definition the duty ratio d. The duty ratio d is transmitted to the adder/multiplier unit 4004 to compute $K*(d/(1-d)^2)^{1/3}$, which is the high side turn on time duration $T_{HS}$ according to the definition. K is a predetermined constant according to equation (24) above. The output from the adder/multiplier unit 4004 is a digital value, which is the number of clock cycles for the high side turn on time duration. By definition, the output from the adder/multiplier unit 4004 times the clock period $\Delta t$ produces the high side turn on time duration. The number of clock cycles is transmitted to a down counter 4006 with a clock signal CLK with a clock period $\Delta t$.

The counter 4006 counts the number of clock cycles to obtain the high side turn on time duration $T_{HS}$ ($T_{HS}$=the number of clock cycles*$\Delta t$). Then the counter 4006 outputs the time duration value $T_{HS}$. The time value $T_{HS}$ is transmitted into a first AND logic circuit 4008 to control the high side driver 1010 and the high side transistor 1016. The first AND logic circuit 4008 also takes the output Vo of the comparator 1002 and a signal from dead time unit 4010 as input. When $V_{REF}<V_{OUT}$, Vo equals 0, which renders the output of the AND logic circuit 4008 zero, which also means that the high side transistor is not turned on. When the AND logic circuit 4008 outputs 0 to the high side driver 1010 through signal line or connection 1010B, the high side driver 1010 is turned off. As a result, the high side transistor 1016 is kept off. On the other hand, when $V_{REF}>V_{OUT}$, Vo equals 1, and the output value of the AND logic circuit 4008 is determined by the output from the counter 4006 and the output from dead time unit 4010. In some embodiments, the output of the first AND logic circuit 4008 is also fed back to the dead time unit 4010 through signal line or connection 1010A. When the high side transistor 1016 is not on, the low side transistor 1014 may be turned on according to the dead time logic. The dead time unit 4010 also sends a signal to a second AND logic circuit 4012, which takes ZCDIN as another input. ZCDIN is a zero-crossing control signal sent from ZCD 1006 to the adaptive control unit 1004. The output of the second AND gate 4012 is transmitted to control the low side driver 1008 through signal line or connection 1008B and the low side transistor 1014. In some embodiments, the output of the second AND logic circuit 4012 is also fed back to the dead time unit 4010 through signal line or connection 1008A. Generally, the dead time unit 4010, by knowing when the high side transistor 1016 and low side transistor 1014 are turned ON and OFF, and implementing logic functions based on these states, prevents the high side transistor 1016 and the low side transistor 1014 from being turned on at the same time to protect the circuit from a short circuit condition. In some embodiments, the ZCDIN input to the AND gate 4012 corresponds to the ZCDIN signal 1006A of FIG. 1. In the embodiment shown in FIG. 4, there is no PCD and the HS transistor 1016 (FIG. 1) turn on time is controlled by either detection of peak currents or by counting clock periods, as discussed above.

Figure 5:
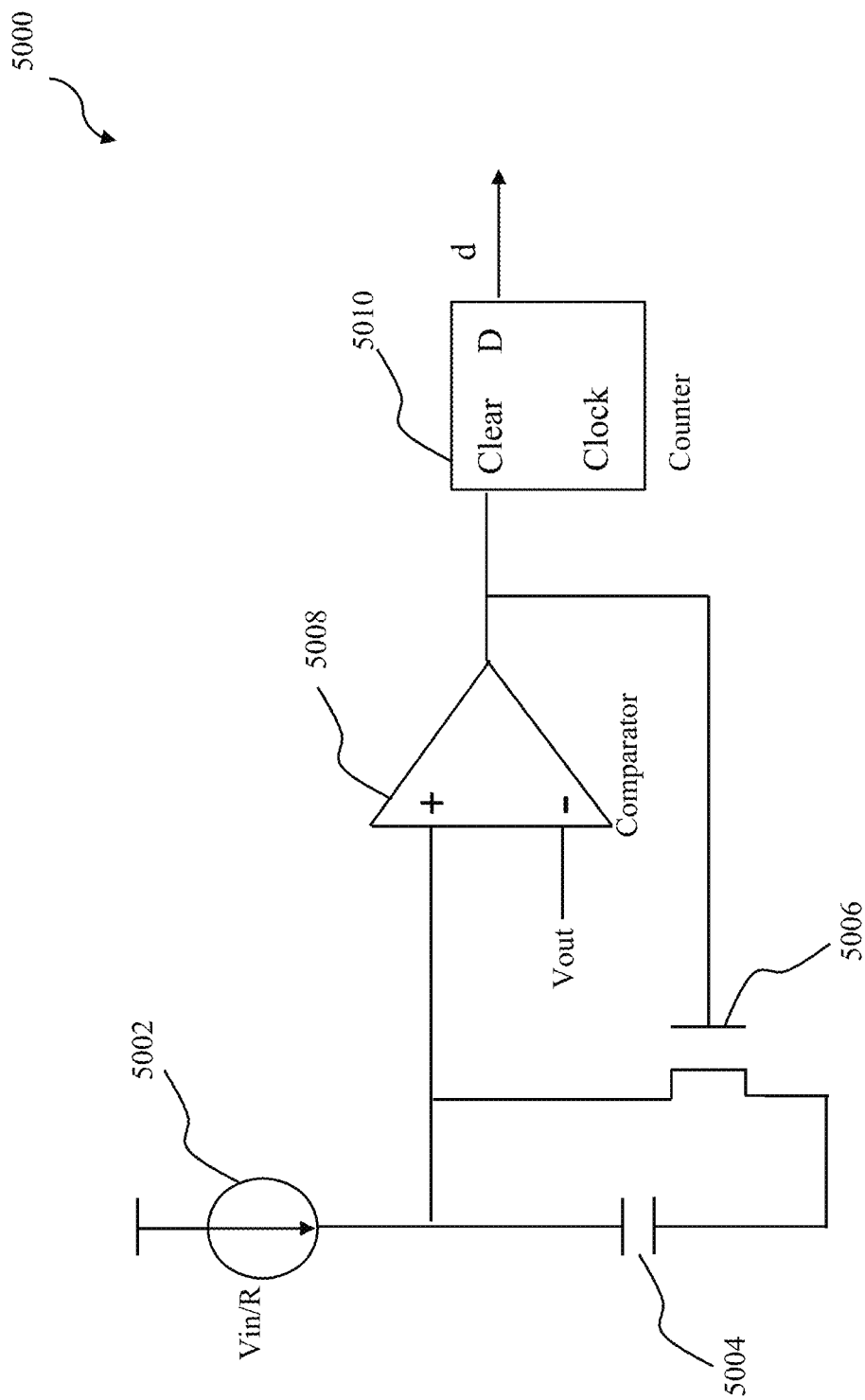
FIG. 5 is a schematic diagram illustrating an analog implementation of an ADC in the adaptive control unit in accordance with some embodiments.

FIG. 5 is a schematic diagram illustrating an analog implementation of the ADC 4002 in the adaptive control unit 1004 in accordance with some embodiments. In this implementation, the ADC includes a current source 5002, a capacitor 5004, an NMOS transistor 5006, a comparator 5008 and a counter 5010. The voltage on the + input of the comparator 5008 is $n*\Delta t*V_{IN}*C/R$, where n is the number of clock cycles of the counter 5010, $\Delta t$ is the duration of a single clock cycle, $V_{IN}$ is the input voltage, and R is a predetermined resistance to generate a charging current from $V_{IN}$. That input ($n*\Delta t*V_{IN}*C/R$) to the comparator 5008 is compared with $V_{REF}$ (or $V_{OUT}$, because $V_{OUT}$ and $V_{REF}$ are maintained very close to each other). Once the condition $n*\Delta t*V_{IN}*C/R=V_{OUT}$ is reached, the counter 5010 outputs duty ratio d and resets the capacitor 5004 by shorting the transistor 5006, making it ready for the next count down. The output of the counter 5010 is the duty ratio d.

Figure 6:
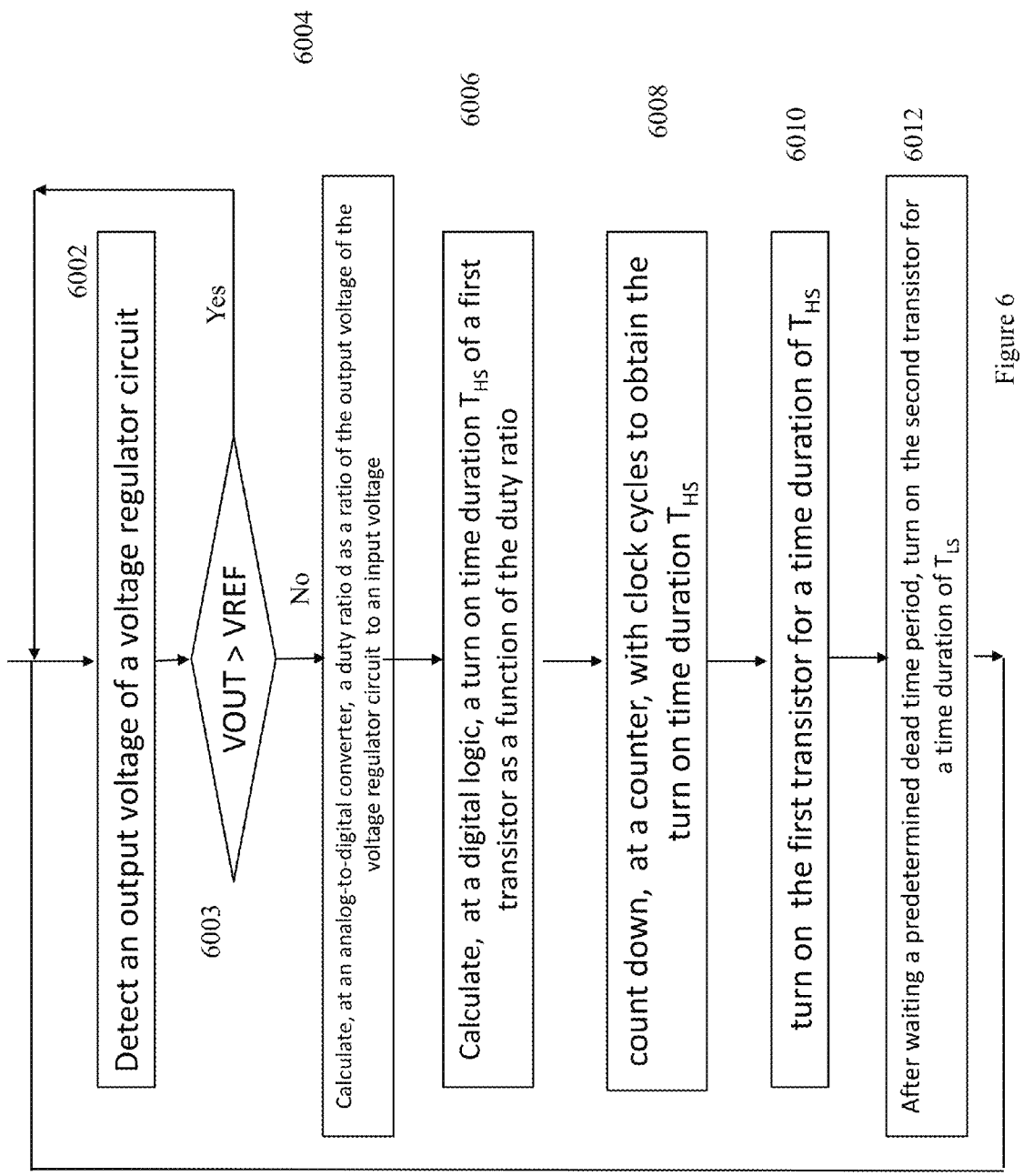
FIG. 6 is a flow chart illustrating an adaptive voltage regulation method in accordance with some embodiments.

FIG. 6 is a flow chart illustrating an adaptive voltage regulation method in accordance with some embodiments. An output voltage $V_{OUT}$ (voltage to be regulated) is measured at step 6002 and compared with a reference voltage $V_{REF}$ at step 6003. When the condition $V_{OUT} \leq V_{REF}$ is detected, a duty ratio at that particular time is calculated as $d=V_{OUT}/V_{IN}$ at step 6004 According to some embodiments, the calculation of the duty ratio is implemented with the ADC 4002 in FIG. 4. At step 6006 the high side turn on time duration $T_{HS}$ corresponding to duty ratio d at that time is determined, e.g., as follows: $T_{HS}=K*(d/(1-d)^2)^{1/3}$, according to the discussion above. The digital value of $T_{HS}$ is converted into a time value by counting a number (which is equal to $T_{HS}$) of clock cycles at step 6008. Then the high side driver 1010 driving the high side transistor 1016 is turned on for a time duration $T_{HS}$ at step 6010. Then the high side transistor 1016 is turned off. After waiting a predetermined dead time period, the low side driver 1008 driving the low side transistor 1014 is turned on for a period of time $T_{LS}$ at step 6012. When both the high side transistor 1016 and the low side transistor 1014 are turned off, the comparator 1002 continues to compare $V_{OUT}$ and $V_{REF}$ to detect the next event when $V_{OUT} \leq V_{REF}$ at step 6014

According to some embodiments, a voltage regulator circuit 1000 is disclosed. The voltage regulator circuit 1000 includes a comparator 1002. The comparator 1002 is configured to have a first input V− coupled to an output voltage $V_{OUT}$ of the voltage regulator circuit, a second input V+ coupled to a reference voltage $V_{REF}$ and an output signal. The voltage regulator circuit also includes a first transistor 1016 and a second transistor 1014, a drain of the first transistor is connected to a drain of the second transistor. The voltage regulator circuit further includes an inductor 1018 connected via node 1024 to the drain of the first transistor 1016 and the drain of the second transistor 1014, a capacitor 1020 and a resistor 1022 connected in parallel, between the inductor 1018, and a source of the second transistor 1014, a peak-current detector unit 1012 configured to detect peak current in the inductor, and a zero-crossing detector unit 1006 configured to detect zero-crossing current in the inductor. The control unit 1004 is configured to receive a plurality of input signals including at least an input voltage and a clock signal.

In some embodiments, the control unit 1004 is configured to adaptively control the voltage regulator circuit 1000 by determining a duty ratio based on a voltage on the output node of the voltage regulator circuit and the input voltage of the control unit, computing a number of clock cycles of a turn-on time duration for the first transistor based on the duty ratio, and counting the number of clock cycles of the turn on time duration to output a signal representing the turn-on time duration.

According to some embodiments, a voltage regulator circuit 1000 further includes an analog-to-digital converter 4002 configured to receive the output voltage $V_{OUT}$ of the voltage regulator circuit and the input voltage, and to output a duty ratio, a digital logic 4004 configured to compute a number of clock cycles of a turn-on time duration for the first transistor based on the duty ratio and a counter 4006 configured to count the number of clock cycles of the turn on time duration to produce the turn-on time duration. The control unit 1004 further includes a dead time unit 4010 configured to prevent the first transistor and the second transistor from being turned on at the same time, a first logic gate 4008 configured to control the first transistor and a second logic gate 4012 configured to control the second transistor.

The analog-to-digital converter further includes a current source 5002 configured to provide a current, a capacitor 5004 which is connected to the output of the current source 5002, a transistor 5006, the source of the transistor is connected to the capacitor 5004 and the output of the current source 5002, the drain is connected to the other side of the capacitor 5004. The analog-to-digital converter further includes a comparator 5008, one input V+ of the comparator is connected to the source of the transistor and the capacitor, the other input V− of the comparator is connected to the output voltage $V_{OUT}$ of the voltage regulator circuit, the gate of the transistor is connected to the output of the comparator. The analog-to-digital converter further includes a counter 5010, the output of the comparator is transmitted to the counter.

According to further embodiments, a control unit disclosed. The control unit 1004 includes an analog-to-digital converter 4002 configured to receive the output voltage $V_{OUT}$ of the voltage regulator circuit and the input voltage, and to output a duty ratio, a digital logic 4004 configured to compute a number of clock cycles of a turn-on time duration for the first transistor based on the duty ratio, a counter 4006 configured to count the number of clock cycles of the turn on time duration to produce the turn-on time duration and a dead time unit 4010 configured to prevent the first transistor and the second transistor from being turned on at the same time. The control unit further includes a first logic gate 4008 configured to control the first transistor and a second logic gate 4012 configured to control the second transistor.

According to further embodiments, a control method is disclosed. The control method includes the steps of comparing, at a comparator, an output voltage $V_{OUT}$ of a voltage regulator circuit with a reference voltage, then detecting a condition of the output voltage $V_{OUT}$ of the voltage regulator circuit being equal to or less than the reference voltage, then calculating, at an analog-to-digital converter, a duty ratio d as a ratio of the output voltage $V_{OUT}$ of the voltage regulator circuit to an input voltage $V_{IN}$, then calculating, at a digital logic, a turn on time duration $T_{HS}$ of a first transistor as a function of the duty ratio, then turning on the first transistor for a time duration of $T_{HS}$, then turning off the first transistor after the time duration of $T_{HS}$, then maintaining a dead time duration when no transistors can be turned on, then calculating a turn on time duration $T_{LS}$ of a second transistor, then turning on the second transistor for a time duration of $T_{LS}$. According to some embodiments, the method further include the steps of re-calculating the duty ratio d as a ratio of the output voltage $V_{OUT}$ of the voltage regulator circuit to an input voltage $V_{IN}$, then re-calculating the turn on time duration $T_{HS}$ of the first transistor as a function of the duty ratio: $T_{HS}=K*(d/(1-d)^2)^{1/3}$, then turning on the first transistor for a time duration of $T_{HS}$, then turning off the first transistor after the time duration of $T_{HS}$, then maintaining a dead time duration when no transistors can be turned on, then re-calculating the turn on time duration $T_{LS}$ of the second transistor: $T_{LS}=I_P*L/V_{OUT}$, and then turning on the second transistor for a time duration of $T_{LS}$.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A voltage regulator circuit comprising:
   a first comparator having a first input, a second input, and an output, wherein the first input is connected to an output node of the voltage regulator circuit, and the second input is connected to a reference node having a reference voltage;
   a first transistor and a second transistor, wherein a drain of the first transistor is connected to a drain of the second transistor;
   an inductor coupled between the drain of the first transistor and the output node;
   a first capacitor and a resistor connected in parallel between the output node and a source of the second transistor;
   a peak-current detector configured to detect peak current through the inductor;
   a zero-crossing detector configured to detect zero-crossing current through the inductor; and
   a control unit configured to receive a plurality of input signals including an input voltage, a clock signal, and the output of the first comparator to adaptively control the voltage regulator circuit, wherein the control unit is configured to:

determine a duty ratio based on a voltage on the output node of the voltage regulator circuit and the input voltage of the control unit;

compute a number of clock cycles of a turn-on time duration for the first transistor based on the duty ratio; and count the number of clock cycles of the turn on time duration to output a signal representing the turn-on time duration.

2. The voltage regulator circuit of claim 1, wherein the control unit further comprises:

an analog-to-digital converter having a first input connected to the output node and the second input connected to the input voltage, wherein the analog-to-digital converter is configured to output the duty ratio;

a digital logic unit having an input connected to an output of the analog-to-digital converter, wherein the digital logic unit is configured to compute the number of clock cycles; and a counter having an input connected to the output of the digital logic unit, wherein the counter is configured to count the number of clock cycles.

3. The voltage regulator circuit of claim 1, wherein the control unit further comprises:

a first logic gate configured to control the first transistor;

a second logic gate configured to control the second transistor; and a dead time unit, coupled to outputs of the first and second logic gates, and configured to prevent the first transistor and the second transistor from being turned on at the same time based on the states of the outputs of the first and second logic gates.

4. The voltage regulator circuit of claim 1, wherein an output of the zero-crossing detector and an output of the peak-current detector are transmitted to the control unit.

5. The voltage regulator circuit of claim 1, wherein the analog-to-digital converter further comprises:

a current source;

a second capacitor connected to an output of the current source;

a third transistor having a drain connected to output of the current source, and a source connected to the second capacitor;

a second comparator, wherein a first input of the second comparator is connected to the drain of the third transistor and to the second capacitor, a second input of the comparator is connected to the reference node or the output node of the voltage regulator circuit, and a gate of the second transistor is connected to an output of the second comparator; and a counter having an input connected to the output of the comparator.

6. The voltage regulator circuit of claim 1, further comprises:

a first driver circuit configured to receive a first control signal from the control unit and drive the first transistor.

7. The voltage regulator circuit of claim 1, wherein the voltage regulator further comprises:

a second driver circuit configured to receive a second control signal from the control unit and drive the second transistor.

8. The voltage regulator circuit of claim 1, wherein the peak-current detector and the zero-crossing detector are connected to the inductor via the first and the second transistors, respectively.

9. The voltage regulator circuit of claim 5, wherein the counter is configured to produce a duty ratio d.

10. A control circuit comprising:

an analog-to-digital converter having a first input connected to a first node and a second input connected to a second node, wherein the analog-to-digital converter is configured to output a duty ratio based on voltages at the first and the second nodes;

a digital logic unit having an input connected to an output of the analog-to-digital converter, wherein the digital logic unit is configured to compute a number of clock cycles of a turn-on time duration for the first transistor based on the duty ratio; and a counter having an input connected to the output of the digital logic unit, wherein the counter is configured to count the number of clock cycles of the turn on time duration to output a signal representing the turn-on time duration; and a dead time unit configured to prevent the first transistor and a second transistor from being turned on at the same time.

11. The control unit in claim 10, further comprises:

a first logic gate configured to control the first transistor; and a second logic gate configured to control the second transistor.

12. The control unit in claim 10, wherein the analog-to-digital converter is configured to divide the output voltage of the voltage regulator circuit by the input voltage to produce a duty ratio.

13. The control unit in claim 10, wherein the digital logic unit is configured to compute a turn-on time for the first transistor according to the formula $T_{HS}=K*(d/1-d)^2)^{1/3}$.

14. The control unit in claim 10, wherein the first logic gate is configured to provide an input to the dead time unit, and the second logic gate is configured to provide an input to the dead time unit.

15. A method for voltage regulation, comprising:

measuring an output voltage at an output node of a voltage regulator circuit;

comparing, at a comparator, the output voltage of a voltage regulator circuit against a reference voltage, to detect a condition of the output voltage being equal to or less than the reference voltage;

calculating, at an analog-to-digital converter, a duty ratio as a ratio of the output voltage to an input voltage;

calculating, at a digital logic circuit, a turn on time duration $T_{HS}$ of a first transistor as a function of the duty ratio, wherein an inductor is coupled between a drain of the first transistor and the output node counting, at a counter, with clock cycles to obtain the turn on time duration $T_{HS}$; and turning on the first transistor for the time duration $T_{HS}$.

16. The method in claim 15, further comprises:

turning off the first transistor after the time duration $T_{HS}$.

17. The method in claim 16, wherein the first transistor is connected to a second transistor, the method further comprises:

maintaining a dead time duration during which neither the first transistor nor the second transistor can be turned on.

18. The method in claim 15, further comprises:

calculating a turn on time duration $T_{LS}$ of a second transistor connected to the first transistor, wherein the turn on time duration $T_{LS}$ is calculated based on the output voltage at the output node of a voltage regulator circuit.

19. The method in claim 18, further comprises:

turning on the second transistor for the time duration $T_{LS}$.

20. The method in claim 19, further comprises:
re-calculating the duty ratio as a ratio of the output voltage of the voltage regulator circuit to the input voltage;
re-calculating the turn on time duration $T_{HS}$ of the first transistor as a function of the re-calculated duty ratio;
turning on the first transistor for the re-calculated time duration $T_{HS}$;
turning off the first transistor after the re-calculated time duration $T_{HS}$;
maintaining a dead time duration during which neither the first transistor nor the second transistor can be turned on;
re-calculating the turn on time duration $T_{LS}$ of the second transistor; and
turning on the second transistor for the re-calculated time duration $T_{LS}$.

\* \* \* \* \*